March 15, 1927.  
E. T. HULL  
1,620,764  
SPEED CONTROLLING APPARATUS FOR ENGINES  
Filed May 16, 1923  
2 Sheets-Sheet 1
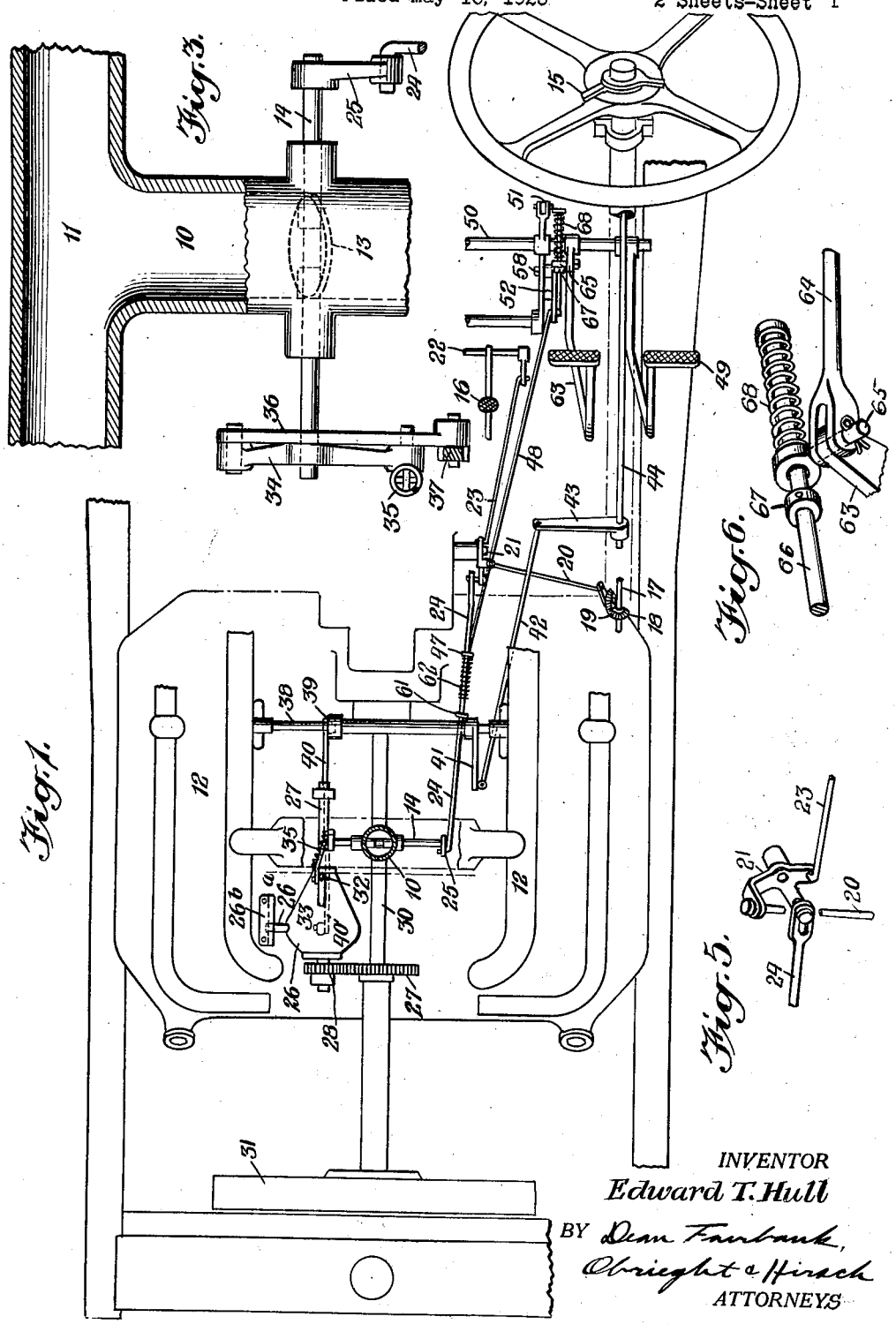
INVENTOR  
Edward T. Hull  
BY  
ATTORNEYS

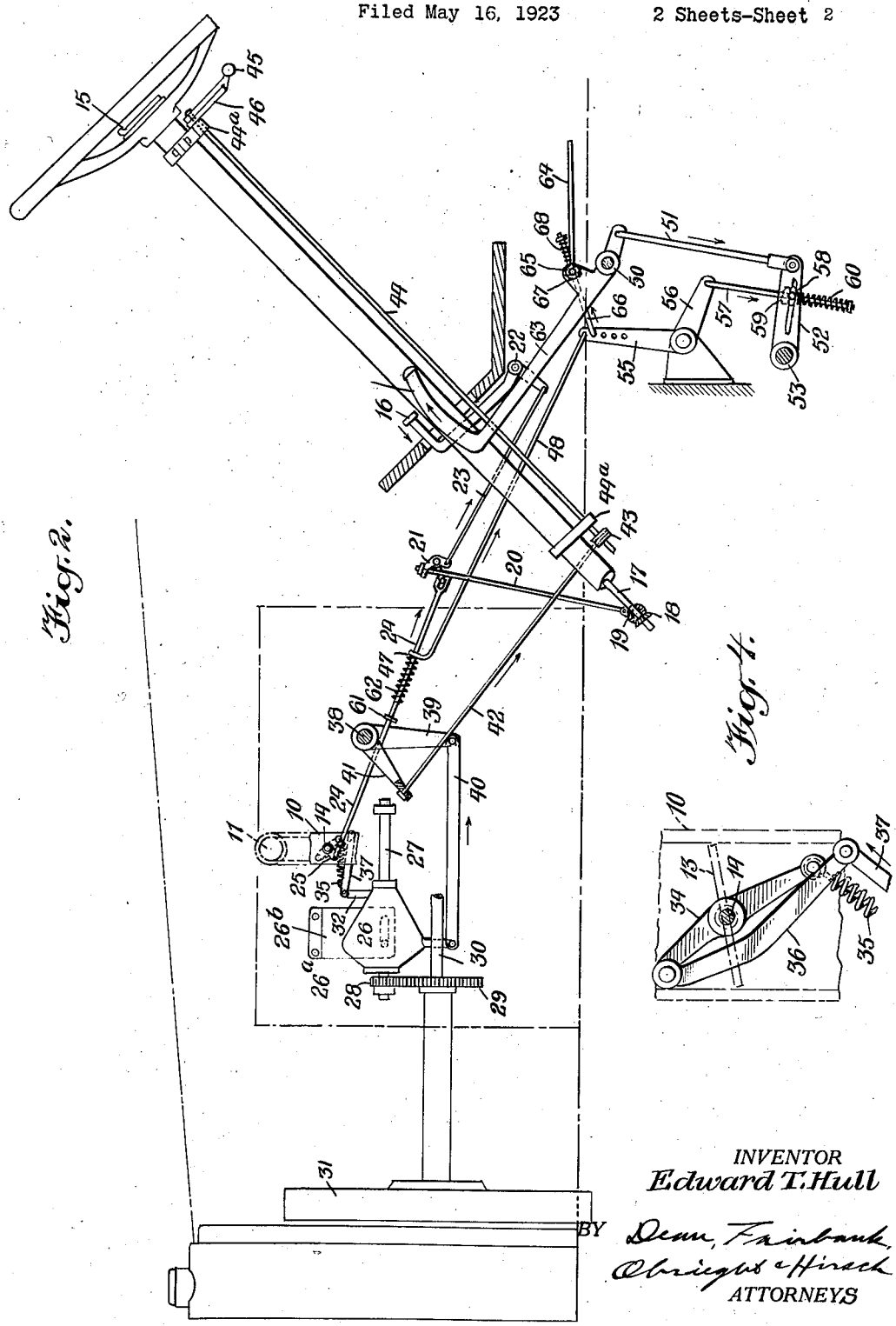

Patented Mar. 15, 1927.

1,620,764

UNITED STATES PATENT OFFICE.

EDWARD T. HULL, OF NEW YORK, N. Y.

SPEED-CONTROLLING APPARATUS FOR ENGINES.

Application filed May 16, 1923. Serial No. 639,306.

This invention is an improvement in speed controlling devices for engines, and in some of its important features is particularly adapted for use on motor driven vehicles.

The main object is to permit the maintenance of definite speed conditions by mechanism which permits temporary acceleration or deceleration without disturbing the set of the mechanism and the automatic re-establishment of the previous definite speed.

As one important feature the application of pressure to the foot brake pedal acts to cut down the gas delivered to the engine, preferably by closing the throttle to idling speed, before the brake band takes hold, so that the engine itself acts as a brake to slow the vehicle to low speed, and is brought into such braking operation by the initial movement of the parts normally used in slowing down and stopping the vehicle. This positively prevents the brake from acting in opposition to any high speed pull of the engine, saves a great deal of wear on the brake bands, saves clutch wear by eliminating the necessity for frequent engaging and disengaging of the same, eliminates the necessity of disengaging the clutch at any time except on coming to a full stop or in changing gears of transmission, and gives a very delicate control of the speed below the speed for which the governor is set, and above the speed at which the engine will pull when idling. The mechanism of this feature of the construction does not in any way interfere with the independent control of the throttle by the automatic governor or the manual means.

As a further feature the application of pressure to the clutch pedal cuts down the gas delivered to the engine to reduce the speed of the engine before the clutch pedal is moved sufficiently far to disengage the clutch. Thus initial movement of the clutch pedal will slow down the engine, and further pressure will disengage the clutch and permit the car to coast or be brought to a stop with the engine at idling speed. Letting in the clutch is automatically followed immediately by the reopening of the throttle and the restoring of the throttle to the direct control of the governor. This permits of a control of the speed of the car between the speed set by the governor and idling speed, by the movement of the clutch pedal alone, and prevents racing of the engine upon disengaging of the clutch. In case it is desired to slow the speed of the car temporarily, as in traffic, it is only necessary to apply pressure to either the clutch pedal or the brake pedal sufficient to slow the car to the desired point, and the removal of this pressure causes the car to immediately pick up to its former speed.

As a further feature I provide an automatic speed governor which acts on the throttle to maintain any desired speed for which the governor is set and acts through yielding connections which permit the further opening of the throttle to increase the speed by the usual operation of the accelerator or steering wheel throttle lever, and also permits the further closing of the throttle to decrease the speed by the application of pressure of the clutch pedal or brake pedal.

As a further feature I make the governor connection to the throttle entirely independent of the aforementioned manually operated connections, whereby the throttle may be positively moved by the manual means rather than through the governor. I use the word "manual" throughout this case in its broad meaning, to include not merely operation by hand, but also by foot, or otherwise within the direct will of the operator and by force applied by him.

As a further feature I so mount the governor that it may be moved bodily in respect to the throttle casing by easily operated mechanism so that the varying at will of the operative relationship between the governor and the fuel controller does not change the adjustment of the operating parts, for instance the fulcrum of a connecting lever.

As a further feature I provide means whereby the clutch and brake pedals are operatively connected to the same member for directly or indirectly controlling the throttle. Thus this member may be moved by the application of pressure to either of the two pedals.

Some of the features of my improved construction involve improvements over, or additions to, or substitutes for the construction or parts of the construction shown in my prior application, Serial No. 577,462, filed July 25th, 1922. Other features are capable of use independently of any features claimed in said application.

In the accompanying drawings I have illustrated one embodiment of my invention. In these drawings:

Fig. 1 is a top plan view.
Fig. 2 is a side elevation,
Figs. 3 and 4 are details of the parts directly associated with the throttle, and
Figs. 5 and 6 are perspective views of other details.

I have illustrated my invention as applied to a motor vehicle having a motor of the V-type with an upwardly extending intake pipe 10 delivering through a transverse conduit 11 to the two intake manifolds 12 of the two cylinder blocks. The intake 10 is provided with a throttle 13 mounted on a rock shaft or spindle 14 which may be oscillated to open and close the throttle. The standard parts for the manual control of the throttle include a hand operated lever 15 mounted on the steering wheel, and a foot operated lever or accelerator 16 in the usual position. The hand lever is mounted on a rod 17 which projects through the steering column and is provided with a gear 18 meshing with a segment 19, which latter is connected by a link 20 to one arm of a bell crank lever 21. The foot lever or accelerator is mounted on a pivot 22 and has an arm connected by a link 23 to another arm of the bell crank lever. A third arm of the bell crank lever 21 is connected by a link 24 to a lever arm 25 on the throttle spindle 14. Thus by pressing on the accelerator 16 or operating the hand lever 15 in the proper direction, a pull is exerted on the rod 24 and the spindle is turned in a counter-clockwise direction from the position shown in Fig. 4, and the throttle is opened to the desired extent.

In the various figures the arrows associated with the moving parts indicate the direction of movement of those parts in an opening of the throttle. Obviously they move in the reverse direction for closing. The parts so far described are not new with me, and may be of any suitable type or character adapted to accomplish the desired result of manually controlling the throttle by the use of the hand or foot. The rod 20 has the usual sliding connections through the bell crank lever 21 to permit operation of the throttle without movement of the hand lever 15, and the bell crank lever has lost motion connections with the rod 24 to permit operation of the throttle by the automatic governor hereinafter referred to and without operation of the bell crank lever.

In my improved construction I provide means for automatically controlling the throttle to maintain any desired fixed speed, and this means includes a suitable governor driven by and operating in accordance with the speed of the engine. I do not wish to be restricted to any particular type of governor, as any means which will exert an operating force in accordance with the speed of the engine may be employed.

The device illustrated is of the ball governor type, and is mounted in a casing 26 slidably mounted upon a drive shaft 27 mounted in suitable bearings on the body of the engine. I have not illustrated any of the details of this governor as they form no portion of my present invention, but the parts may be similar to or substantially identical with those illustrated in my co-pending application, Serial No. 538,813, filed February 23rd, 1922. The drive shaft of the governor on which the governor casing is slidably but non-rotatably mounted, has a pinion 28 meshing with a gear 29 on a shaft 30. The latter may be any suitable shaft forming a part of the engine, as for instance, that employed in driving the fan 31 or other parts such as the magneto, generator, water pump, or the like. The governor has an arm 32 secured to the operating mechanism and projecting radially through a slot 33 in the casing of the governor. The operating mechanism is such that as the speed of the engine and governor parts increases, the arm 32 moves toward the left to close the throttle and slow down the speed, while a decrease in speed moves said arm to the right and opens the throttle. The parts are shown in the drawings substantially in their limiting positions for low speed operation of the engine. The arm 34 is secured intermediate of its ends to the throttle spindle 14, and one end of this arm is connected by a tension spring 35 directly to one end of the arm 32. The opposite end of the arm 34 is connected by a pair of pivotally connected links 36 and 37 to the arm 32. The link 36 normally lies approximately parallel to the arm 34, while the link 37 normally lies substantially parallel to the spring 35 and substantially at right angles to the arm 32. Obviously this arm 32 may be made of any desired length, and may even be reduced to a mere lug or other connecting means for the spring 35 and link 37 to the endwise moving parts of the governor. The arm 34 and link 36 are pivotally connected at one end as previously noted, and at the other end are adjacent to each other, and so designed that they cannot pass each other but may be separated by an expansion or stretching of the spring 35. Thus if the link 36 be held against endwise movement the throttle 13 may be opened as the lower end of the arm 34 may be swung away from the link 36 by the stretching of the spring 35. By means of this connection the throttle may be positively opened by the link 24, irrespective of the action of the governor, but the sliding back and forth of the reciprocating parts of the governor will open and close the throttle due to the lost motion connections between the rod 24 and the bell crank lever 21.

For setting the governor and establishing speed at which it is desired to maintain the engine, I provide as an important feature of my present invention means for positively sliding the entire governor casing and its operating parts along the shaft 27. The casing of the governor may be held against rotation on the shaft and its endwise movement limited in any suitable manner as for instance by means of a pin 26ª slidable in a slot of a bracket 26ᵇ or other stationary part. As shown the reciprocating mechanism includes a bell crank lever on a rock shaft 38, and having an arm 39 connected by a link 40 to a lug or bracket on the governor casing 26. Another arm 41 of the bell crank lever is connected by a rod 42 to an arm 43 on a rock shaft 44, substantially parallel to the steering column and mounted in brackets 44ª on the latter. The upper end of the rock shaft 44 is provided with an operating handle or lever 45 movable over a segment 46 whereby the lever may be locked in any desired position. By oscillating this lever 45 the motion may be directly transmitted to the casing of the governor and the latter may be adjusted to the desired position along the shaft 27.

It will be noted that by moving the governor casing toward the right from the position shown in Fig. 2, the throttle will be opened to permit increased speed of the engine but this increased speed will move the part toward the left to partially reclose the throttle. The governor may thus be brought to such position as will hold the engine speed constant. Any reduction in the load on the engine which would tend to speed up the engine will cause the governor to close the throttle to such position that the speed will remain the same under the lighter load.

To slow down the engine to idling speed by the operation of the clutch pedal or the brake pedal, the rod 24 is provided with a collar 47 connected to a rod 48. The clutch pedal 49 is mounted on a pivot 50, and is connected by a link 51 to an arm 52 on the clutch operating rock shaft 53, so that by pressure on the clutch pedal the rock shaft is caused to turn in a clockwise direction. I have not illustrated the clutch nor the usual heavy spring for normally holding the clutch parts engaged, but it will be understood that the clutch may be of the usual type and operated in the usual manner from the rock shaft 53. The rod 48 is connected to the clutch operating mechanism so that by pressing on the clutch pedal the rod 48 is moved endwise toward the left, as viewed in Fig. 2. The operating mechanism includes a bell crank lever having an arm 55 connected to the rod 48 and an arm 56 connected by a link 57 to the clutch operating arm 52. The connection between this link 57 and the arm 52 includes an eye-bolt 58 adjustable along the arm or lever 52 to vary the leverage. The link 57 is slidable through the eye of the eye-bolt, there being a stop collar 59 above the eye, and a compression spring 60 below it.

The connection between the rod 48 and the rod 24 includes a stop collar 61 on the rod 24, and a compression spring 62 between said stop collar and the collar 47 of the rod 48.

The arm 55 is much longer than the arm 25 and therefore the rod 48 has a greater range of movement than the rod 24. Lost motion between the spring 62 and collar 61 permits the throttle to be operated by the accelerator pedal 16 without compression of the spring. A slight movement of the clutch pedal takes up this lost motion; a further movement operates the throttle without compressing the spring 62, and a further movement is permitted by compressing the spring.

The brake pedal 63 is pivoted on the same pivot or rock shaft 50 as the clutch pedal, and is connected to the usual brake rod 64. In place of the usual pin for connecting the brake pedal to the brake rod I employ an eye-bolt 65 through the eye of which is slidably mounted a rod 66. One end of this rod is connected to the bell crank lever arm 55, and a stop collar 67 is secured on one side of the eye-bolt and a compression spring 68 acts between the eye and a head on the other end of the rod. The rod 66 may be connected to the bell crank lever arm 55 at various points along the length of the latter to vary the effective leverage. In Fig. 1 the brake rod 64 is omitted to avoid confusion, and in Fig. 6 the spring is shown under some compression, as when the clutch pedal is somewhat depressed.

By reason of the connections between the two pedals and the rod 48, it will be noted that this rod will be positively moved toward the left, as viewed in Fig. 2 by the movement of either the clutch pedal or the brake pedal, and that the movement of one does not in any way interfere with the movement of the other. By pressing on the clutch pedal the rod or link 57 is positively lifted by reason of the stop collar 59, while the rod 66 may pull through the eye-bolt 65 by reason of the compression spring 68, as shown in Fig. 6. By pressing on the brake pedal the rod 66 is forced endwise by reason of the stop collar 67, and the rod 57 may pull up by reason of the compression spring 60. The rod 24 is positively connected to the throttle and the spring 62 is made strong enough to overcome the action of the governor. Thus the application of pressure to either the brake pedal or the clutch pedal positively closes the throttle irrespective of the set of the governor or the speed of the engine. The lost motion at the end of the spring 62 permits the throttle to be easily opened by means of the steering wheel throttle lever 15 or the accelerator 16.

With my improved construction the governor may be set to maintain any desired engine speed, but this speed may be cut down to any extent or even to idling by pressure on the clutch pedal or the brake pedal, and may be increased to temporarily speed up the engine by pressure on the accelerator or movement of the steering wheel throttle lever without disturbing the set of the governor.

In the mechanism illustrated, the speed of the engine is controlled by an opening and closing of the throttle. This throttle constitutes merely one form of fuel controller which may be employed, as other types of engines may have the speed varied by controlling the supply of fuel or other motive fluid by means of other forms of controllers. Although preferably the throttle is controlled by both the brake pedal and the clutch pedal, it will be apparent that by omitting the rod 66 or the rod 57, the control by either pedal may be omitted.

In some installations I may prefer to use the governor mechanism described in my copending application, Serial No. 577,462, in connection with the pedal parts hereinbefore described. In that event I may use the means for operating the rod 48 of the present application to operate the parts operated by the rod 48 of application 577,462.

Having thus described my invention, what I claim as new and desire to secure by Letters Patent is:

1. A vehicle having an engine motive fluid controller, an automatic speed governor operated by the engine, a brake lever, operating connections between said lever and said controller, and yielding connections between said speed governor and said controller entirely independent of the first mentioned connections.

2. A vehicle having an engine motive fluid controller, an automatic speed governor operated by the engine, connections between said governor and said controller, manually operable means for setting said controller to maintain any desired engine speed, a brake pedal, and means independent of the governor and its connections to the controller, and operating directly on said controller for closing the latter to idling speed upon application of pressure to said brake pedal.

3. In combination, an engine motive fluid controller, an automatic speed governor operated by the engine and operatively connected to said controller, and means for bodily moving the governor to establish various desired speeds of the engine.

4. A construction as defined in claim 3, in which the governor is bodily movable axially and includes a part independently movable axially upon variations in speed.

5. In combination, an engine motive fluid controller, an automatic speed governor operated by the engine and including a part axially movable upon variations in engine speed, yielding connections between said part and said controller, and means for bodily moving the governor axially to establish different engine speeds.

6. In combination, an engine motive fluid controller including an oscillatory spindle, an automatic speed governor operatively connected to one end of said spindle, and a brake pedal operatively connected to the other end of the spindle.

7. In combination, an engine motive fluid controller including an oscillatory spindle, an automatic speed governor operatively connected to one end of said spindle, and a clutch pedal operatively connected to the other end of the spindle.

8. In combination, an engine motive fluid controller including an oscillatory spindle, an automatic speed governor operatively connected to one end of said spindle, a brake pedal, a clutch pedal, and means operatively connecting both of said pedals to the other end of the spindle.

9. In combination, an engine motive fluid controller, an automatic speed governor operated by the engine, a manually operable device, positive connections between said device and said controller, yielding connections between said speed governor and said controller, and means for bodily moving the governor in respect to the controller.

Signed at New York in the county of New York and State of New York this 11th day of May A. D. 1923.

EDWARD T. HULL.